United States Patent [19]

Akahane

[11] Patent Number: 5,347,424
[45] Date of Patent: Sep. 13, 1994

[54] TILTING MECHANISM HAVING ROTATABLE EXTENSION, FOR INFORMATION INPUTTING APPARATUS

[75] Inventor: Ryosuke Akahane, Kanagawa, Japan

[73] Assignee: Sony Corporation, Japan

[21] Appl. No.: 946,610

[22] Filed: Sep. 18, 1992

[30] Foreign Application Priority Data

Sep. 20, 1991 [JP] Japan .............. 3-084729[U]

[51] Int. Cl.⁵ .................. H05K 5/02; G06F 1/16
[52] U.S. Cl. ........................ 361/680; 400/682;
108/117; 74/104; 74/527; 248/688
[58] Field of Search ............... 400/681, 682, 683;
108/115, 117, 121, 122, 123, 128; 74/104, 107, 527; 248/688, 918, 923; 364/708, 708.1;
361/380, 390–395, 399, 679–686, 724–726, 730, 752, 796; D14/100, 106

[56] References Cited

U.S. PATENT DOCUMENTS

| | | | |
|---|---|---|---|
| D. 332,605 | 1/1993 | Krakower et al. | D14/106 |
| D. 332,783 | 1/1993 | Krakower et al. | D14/106 |

*Primary Examiner*—Leo P. Picard
*Assistant Examiner*—Michael W. Phillips
*Attorney, Agent, or Firm*—Hill, Steadman & Simpson

[57] ABSTRACT

A first shaft 2a and a first guide portion 2c are provided on a rear side portion 2 of an information inputting apparatus. The first guide portion 2c advances in a direction spaced away from the first shaft 2a toward below, and a notch hole 2h connects to a lower portion of the first guide portion 2c. Then, a second guide portion 3b for engaging with the first shaft 2a and a second shaft 3d for engaging with the first guide portion 2c are provided on the foot member 3, and a pair of resilient pieces 3e are provided on side faces of the foot member 3. Further, a foot cover 5 is provided which has an extending through portion 5e for moving the foot member 3 to appear and disappear and is supported for rotation on the first shaft 2a. When the hook member 3 is rotated the distance between an end portion 3a of the hook member 3 and the first shaft 2a increases gradually, and when the hook member 3 is rotated also after the resilient pieces 3e are contacted with resilient piece receiving portions 5i of the hook cover, the second shaft 3d is fitted with the notch hole 2h.

5 Claims, 4 Drawing Sheets

F I G. 4(a)
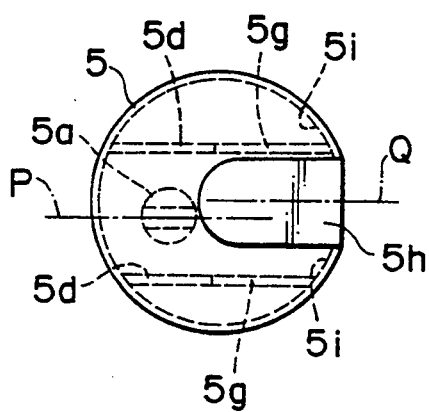
F I G. 4(b)
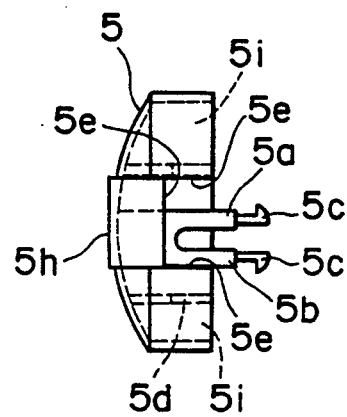
F I G. 4(c)
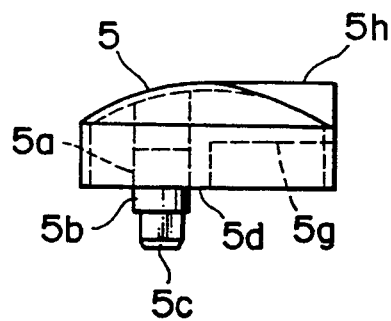

TILTING MECHANISM HAVING ROTATABLE EXTENSION, FOR INFORMATION INPUTTING APPARATUS

BACKGROUND OF THE INVENTION

The present invention relates to an information inputting apparatus, and more particularly to a tilting mechanism for the information inputting apparatus.

Conventionally, a tilting mechanism for an information inputting apparatus is constructed such that foot members are provided for rotation on a bottom face or the like of a rear portion of the information inputting apparatus and, when the information inputting apparatus is to be used, the foot members are rotated to be set up to raise the rear portion of the information inputting apparatus using the foot members as legs to tilt the information inputting apparatus.

Accordingly, in order to tilt the information inputting apparatus to a greater degree, the rear portion of the information inputting apparatus must be raised higher, and to this end, longer foot members must be used.

However, since foot members must be made longer, there is a problem that it is disadvantageous when it is intended to reduce the thickness or the size of the apparatus.

Further, since foot members become longer, the foot members are arranged in most cases on a bottom face of the apparatus, and there is a problem that the range of designing of the tilting mechanism and/or the information inputting apparatus is restricted.

OBJECT AND SUMMARY OF THE INVENTION

Thus, it is an object of the present invention to provide a tilting mechanism for an information inputting apparatus wherein reduction in thickness and size of an information inputting apparatus can be achieved and foot members can be disposed on side faces or the like of the apparatus and accordingly various ranges of designing of the tilting mechanism and/or the apparatus can be achieved.

According to present invention, a tilting mechanism for an information inputting apparatus includes a substantially vertical face portion at a rear portion of the information inputting apparatus and a foot member opposed to the substantially vertical face portion. They are engaged with each other at two positions at each of which a fixed shaft provided on one side of them and a sliding portion provided on the other side of them for slidably moving on the fixed shaft are fitted with each other. When the information inputting apparatus is to be used, the sliding portions and the fixed shafts are slidably moved relative to each other from a retracted condition. Then the foot member is projected to a great extent below the information inputting apparatus by rotation and sliding movement. And the foot member may serve as legs of the information inputting apparatus thereby to tilt the information inputting apparatus by a great amount.

BRIEF DESCRIPTION OF THE DRAWINGS

FIG. 1(a) is a view of a retracted condition, FIG. 1(b) is a view immediately before a foot member is set up and, FIG. 1(c) is a view of a condition wherein the foot member is set up;

FIG. 2(a) of the same figure is a front elevational view, FIG. 2(b) is a bottom plan view, and FIG. 2(c) is a sectional view taken along line 2C—2C of (a) of the same figure;

FIG. 3(a) is a front elevational view of the foot member, and FIG. 3(b) is a side elevational view of the same;

FIGS. 4(a) and 4(b) are views showing a foot cover, FIG. 4(a) is a front elevational view of the foot cover, FIG. 4(b) is a side elevational view of (a) of the same figure as viewed from the right-hand side, and FIG. 4(c) is a side elevational view of (a) of the same figure as viewed from the lower side;

DESCRIPTION OF THE PREFERRED EMBODIMENTS

An embodiment of the present invention will be described in detail with reference to the drawings.

Figure 5:
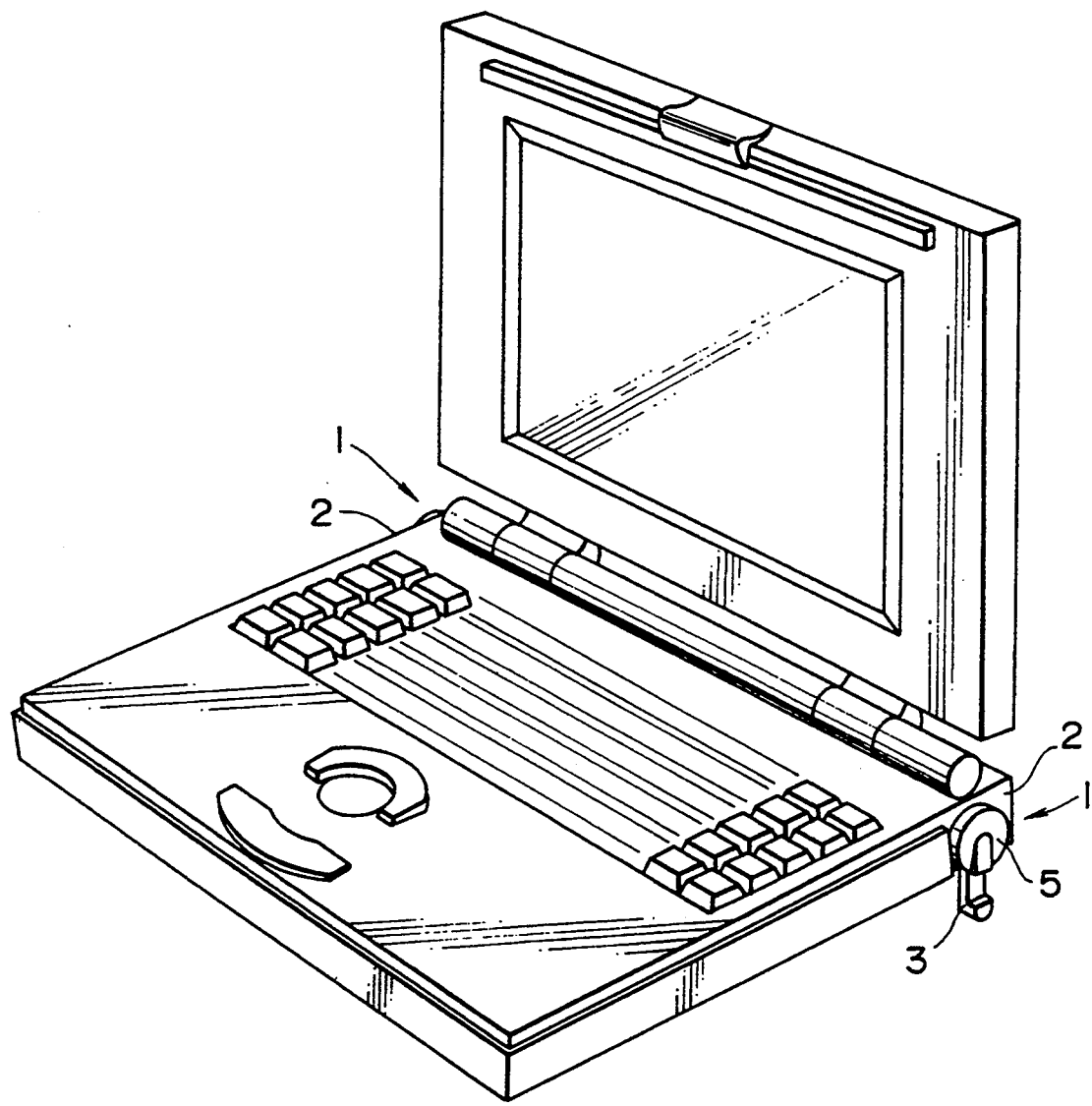
FIG. 5 is a perspective view of the entire information inputting apparatus when the foot member is set up.

As shown in FIG. 5, a pair of tilting mechanisms 1 are provided on the opposite side portions 2 of a rear portion of an information inputting apparatus.

Since the pair of tilting mechanisms 1 have same construction, only the right-hand side tilting mechanism 1 in FIG. 5 will be described below.

Figure 2A:
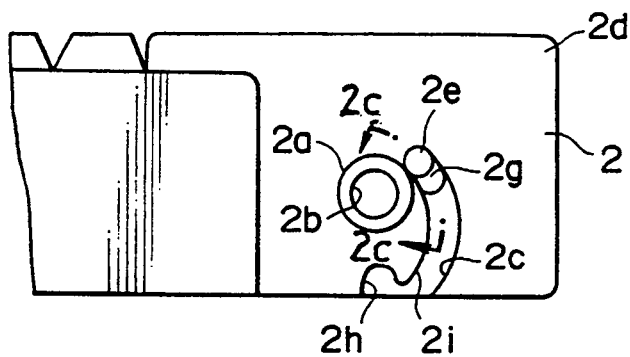
FIG. 2(a)-2(c) are views showing a substantially vertical face portion of a rear portion of an information inputting apparatus (side portion of the rear portion of the information inputting apparatus)
Figure 2B:
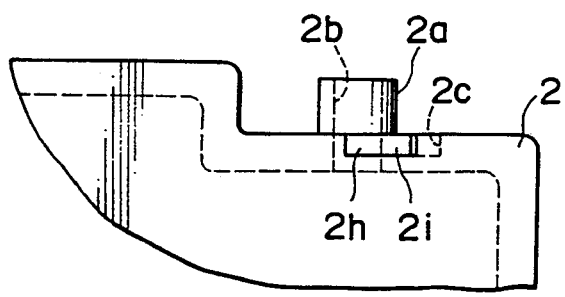
Figure 2C:
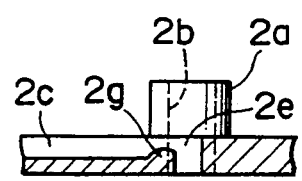

A side portion 2 of a rear portion of the information inputting apparatus makes a vertical face portion, and as shown in FIG. 2, a first cylindrical fixed shaft 2a is provided at and extends outwardly from a position a little lower than a central position of the side portion 2 in the vertical direction. A hole 2b of the first fixed shaft 2a extends inwardly of the apparatus through the side portion 2. Subsequently, a first guide portion 2c is provided in a condition wherein it has a starting portion 2e provided in a contacting relationship with a position of an outer peripheral portion of the first fixed shaft 2a directed toward an upper side corner portion 2d of the side portion 2, and after then, it has a shape of a spiral line which advances in a direction gradually spaced apart from the first fixed shaft 2a toward a bottom face of the apparatus and then passes a lower end edge of the side portion 2 as it is. The first guide portion 2c is formed as a groove which is shallower than the thickness of material of the side portion 2 and having a width substantially equal to a diameter of a second fixed shaft which will be hereinafter described. And, as shown in (c) of FIG. 2, a bottom face of the groove at a portion 2g immediately behind the starting portion 2e of the first guide portion 2c is swollen so that it is smaller than the height of the second fixed shaft which will be hereinafter described, and at the starting portion 2e, a hole having a substantially same diameter as that of the second fixed shaft extends through the side portion 2. And, an upwardly directed notch hole 2h is provided at a terminal end portion of the guide groove 2c at a position substantially immediately vertically downwardly of the first fixed shaft 2a and is connected to the guide groove 2c, and the second fixed shaft can be fitted into the notch hole 2h by slidably moving the same along the guide groove 2c and then slidably moving the same along an inner end face 2i of the guide groove 2c.

Figure 3A:
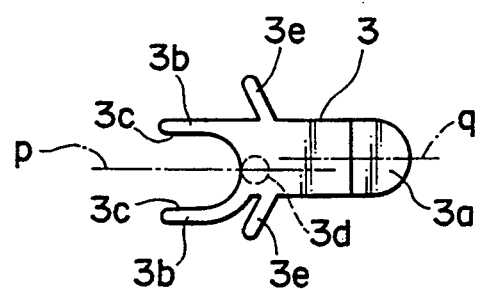
FIGS. 3(a) and 3(b) are views showing a foot member.
Figure 3B:
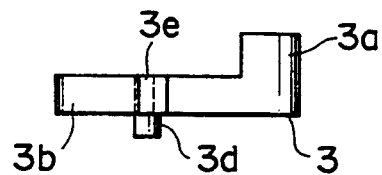

Subsequently, a foot member 3 has a shape of a flat bar as shown in FIG. 3 and is made of a synthetic resin, and a front end portion 3a thereof is extended upwardly of (b) of FIG. 3 to make a thicker material portion. And, rear portions 3b of the foot member 3 make second guide portions. The second guide portions 3b are formed from an axially symmetrical bifurcated portion, and the distance between inner ends 3c of the bifurcated portion 3b is substantially equal to an outer diameter of the first fixed shaft 2a. The second guide portions 3b are slidable relative to the first fixed shaft 2a in a condition wherein the first fixed shaft 2a is held between the inner ends 3c of the bifurcated portion 3b. It is to be noted that the axis p of symmetry of the bifurcated portion 3b is positioned a little eccentrically from an axial line q of the foot member 3. And, the second fixed shaft 3d is provided uprightly at a root portion of the bifurcated portion 3b of a rear face of the foot member 3. The height of the second fixed shaft 3d is substantially equal to the depth of the groove of the first guide portion 2c. And, a pair of resilient pieces 3e molded integrally on the foot member 3 extend sidewardly from the opposite side portions of the foot member 3.

Subsequently, as shown in FIG. 4, a foot cover 5 is in the form of a lid constituted from a cylindrical portion and a roof portion formed on an end edge of the cylindrical portion and constituted from part of a spherical shape. And, a pivotal shaft 5a is provided projectingly at a position of a rear face side of the foot cover 5 a little eccentric from a central portion of the foot cover 5, and the pivotal shaft 5a is formed in a bifurcated portion 5b from an intermediate portion thereof. Each of a pair of end portions of the bifurcated portion 5b is formed as an outwardly folded portion 5c. The diameter of the pivotal shaft 5a is substantially same as the inner diameter of the first fixed shaft 2a. And, a pair of third guide portions 5d which are spaced apart from each other by a distance substantially equal to the distance between outer ends of the second guide portions 3b of the foot member are provided uprightly and in parallel with each other at positions spaced apart equally from the pivotal shaft 5a on the rear face side of the foot cover 5 in such orientation that, when the guide portions 5d are slidably moved with the foot member 3 held therebetween, the axial line q of the foot member 3 may move along a diameter of the foot cover 5. And, an extending through portion 5e is formed in a side face portion of the foot cover 5 so that the foot member 3 may slidably move therein. The size of the extending through portion 5e is substantially equal to the size of a sectional area of the foot member 3. The amount of eccentricity between the axis P of symmetry of the pair of third guide portions 5d and an axial line Q interconnecting a central portion of the extending through portion 5e and a central point of the foot cover 5 is equal to the amount of eccentricity between the axis p of symmetry of the foot member 3 and the axial line q. The foot member 3 is slidable in a fixed direction relative to the foot cover 5 through the extending through portion 5e with an outside of the second guide portion 3b thereof guided by the pair of guide portions 5d. It is to be noted that the pair of guide portions 3d terminate at a substantially central portion of the foot cover 5 such that they may not interfere with sliding movement of the resilient pieces 3e in sliding areas of the resilient pieces 3e, and, ahead of there, stepped portions 5g are formed, along which the resilient pieces 3e slidably move in a contacting condition. The foot member 3 is contacted at an upper face thereof with an upper edge of the extending through portion 5e, and as the resilient pieces 3e are contacted with the stepped portions 5g, the foot member 3 is positioned in the vertical direction with respect to the foot cover 5. Subsequently, cylindrical side face portions 5i of the foot cover 5 around the extending through portion 5e make resilient piece receiving portions with which the resilient pieces 3e of the foot member are contacted when the foot member 3 is projected from the foot cover 5. Subsequently, a horizontal portion 5h is formed on the upper face of the foot cover 5 such that it extends from a central portion of the upper face of the foot cover 5 toward the extending through portion 5e and has a width substantially equal to the width of the foot member 3, and the height of the horizontal portion 5h is substantially equal to the height of the thicker material portion 3a when the foot member 3 is fitted with the foot cover 5. The horizontal portion 5h is a decorating portion for making the width and the height thereof coincide with those of the foot member 3 to improve the design of the tilting mechanism 1.

The individual elements are constructed in such a manner as described above, and in order to assemble the tilting mechanism, the foot member 3 is first accommodated into the foot cover 5, and then the pivotal shaft 5a of the foot cover 5 is inserted into the hole 2b of the first fixed shaft 2a of the side portion 2 with the bifurcated portion 5b thereof held in a contracted condition. Consequently, the folded portions 5c at the end portions of the bifurcated portion are opened, after they pass the thicker material portion of the side portion 2 and come out to the inside of the apparatus, so that are caught by an inner face side of the side portion 2 and the foot cover 5 is arrested to the first fixed shaft 2a. Consequently, the foot cover 5 is positioned relative to the side portion 2, and the foot member 3 is held and positioned between the side portion 2 and the foot cover 5.

Subsequently, action of the tilting mechanism of the present invention will be described.

Figure 1A:
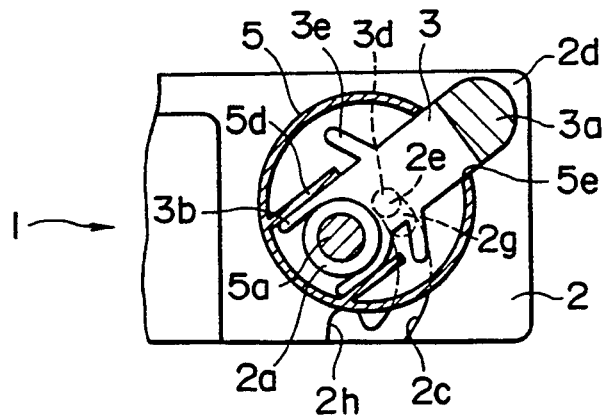
FIGS. 1(a)-1(c) are front elevational sectional views as viewed from a side face of an apparatus showing a tilting mechanism of the present invention.
Figure 1B:
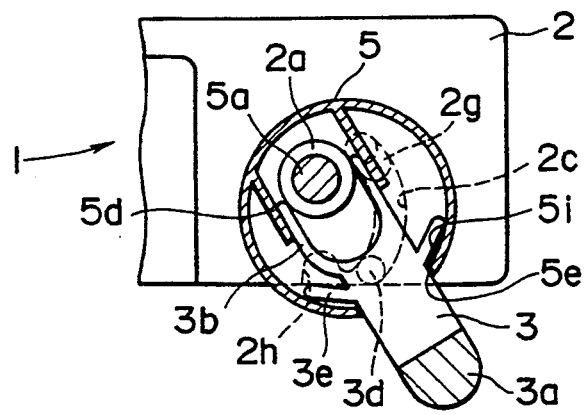
Figure 1C:
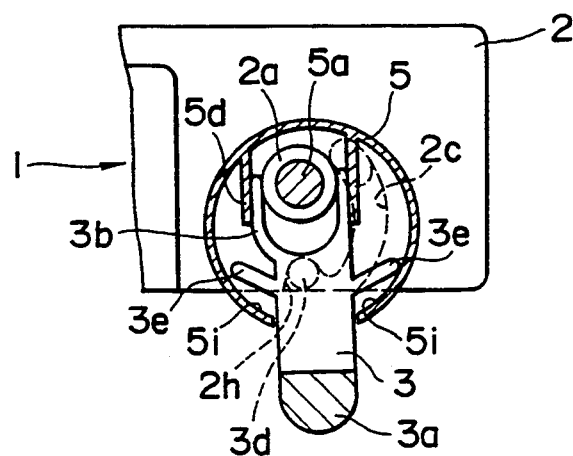

In a retracted condition, that is, when the tilting mechanism 1 is not used, the second fixed shaft 3d is at the position of the hole 2e at the starting position of the first guide portion as shown in (a) of FIG. 1. In this instance, the second guide portions 3b are fitted at the most interior portions thereof with the first fixed shaft 2a, that is, the distance between the first fixed shaft 2a and the end portion 3a of the foot member 3 is in the minimum, and the end portion 3a of the foot member 3 is at the position of the right upper side corner portion 2d of the side portion 2. Consequently, the foot member 3 is accommodated in the plane of the side portion 2 without projecting from the latter. Further, since the center of the pivotal shaft 5a of the foot cover 5 is eccentric leftwardly and downwardly from the center of the foot cover 5 as shown in (a) of FIG. 4, in the condition of (a) of FIG. 1, it is possible to raise the foot cover 5 to a most upper position with respect to the bottom face of the side portion 2. Since the bottom face of the groove of the portion 2g of the first guide portion 2c immediately behind the starting point 2e is swollen, the second fixed shaft 3d cannot ride over the portion 2g and is locked at the starting position 2e.

Subsequently, when the tilting mechanism 1 is to be used, the foot cover 5 will be rotated by a predetermined force. Consequently, the second fixed shaft 3d rides over the portion 2g where the bottom face of the groove is swollen and then moves along the first guide portion 2c as shown in (b) of FIG. 1, and at the same time, the second guide portions 3b of the foot member slidably move while being turned with respect to the first fixed shaft 3a. Consequently, the end portion 3a of the foot member 3 can reach a farther position from the first fixed shaft 2a. Further, when the second fixed shaft 3d reaches to the proximity of the notch hole 2h, the resilient pieces 3e are contacted with the resilient piece receiving portions 5i so that high resistance against the end portion 3a of the foot member 3 reaching a farther position from the first fixed shaft 2a is produced by a repulsive force between the resilient pieces 3e and the resilient piece receiving portions 5i, and consequently, an increased force is required for rotation of the foot cover 5 and the foot member 3.

And, if the rotation is continued against the force, then the second fixed shaft 3d reaches the notch hole 2h as shown in (c) of the same figure, and the end portion 3a of the foot member 3 is moved a little toward the first fixed shaft 2a by a repulsive force between the resilient pieces 3e and the resilient piece receiving portions 5i so that the second fixed shaft 3d is fitted into the notch hole 2h. In this instance, the foot member 3 makes a substantially right angle with respect to the bottom face of the apparatus, and the end portion 3a of the foot member 3 extends to a great extent with respect to the first fixed shaft 2a and thus extends downwardly to a great extent from the bottom face of the apparatus. Upon returning from a condition wherein the second fixed shaft 3d is fitted in the notch hole 2h to another condition wherein the second fixed shaft 3d is not fitted in the notch hole 2h, a great force must be applied against the repulsive force between the resilient pieces 3e and the resilient piece receiving portions 5i, and accordingly, the second fixed shaft 3d is locked at the position of the notch hole 2h.

When the apparatus is placed onto a desk or the like with the left and right tilting mechanisms 1 of the apparatus set in the condition of (c) of FIG. 1, the apparatus can be tilted by a great angle as shown in FIG. 5, and consequently, a user can perform inputting further readily.

When the tilting mechanisms 1 are to be accommodated, the foot members 3 and the foot covers 5 of the left and right tilting mechanisms 1 are rotated in the opposite direction to that described hereinabove into the condition of (a) of FIG. 1.

Since the present invention allows sliding movement at either of two fitting portions between a substantially vertical face portion and a foot member, as shown in the embodiment described above, when the tilting mechanism is in its retracted condition, the rear portion of the foot member 3 is projected to the opposite side of the end portion 3a with respect to the first fixed shaft 2a, and an empty spacing at the portion is utilized effectively. Further, consequently the end portion 3a of the foot member 3 becomes nearer to the first fixed shaft 2a, and it becomes possible to accommodate the foot member in a small accommodating spacing and it becomes possible to achieve reduction in thickness and size of the information inputting apparatus. Further, since the foot member 3 is recognized, when the foot cover 5 is rotated such that it is projected toward the rear face side of the apparatus, as if it jumps out from the foot cover 5 but it is recognized, when it is accommodated, as if it is accommodated into the foot cover 5 simultaneously when the foot cover 5 is raised upwardly, the esthetic sense of the tilting mechanism 1 is very high.

While, in the present embodiment, the second guide portions 3b of the foot member are supported from the inner side thereof by the first fixed shaft 2a and is supported from the outer side by the guide portions 5d of the foot cover, the second guide portions 3b of the foot member must only be supported by either one of the first fixed shaft 2a and the guide portions 5d of the foot cover. For example, when the foot cover 5 of the present embodiment is provided, the second guide portions 3b may be supported only by the guide portions 5d of the foot cover. Further, the foot cover 5 may not be provided. In this instance, the second guide portions 3b may be extended rearwardly and a pair of resilient pieces may be provided projectingly on inner sides of a bifurcated portion of the portion such that the resilient pieces may be contacted with an outer peripheral face of the first fixed shaft 2a when the second fixed shaft 3d comes to the proximity of the notch hole 2h.

Further, the present invention requires that a substantially vertical face portion of a rear portion of an information inputting apparatus and a foot member must only be engaged with each other by fitting a fixed shaft provided on either one side of them with a sliding portion provided on the other side of them, and for example, a first guide portion and a second guide portion may be provided on a substantially vertical face portion while a first fixed shaft and a second fixed shaft are provided on a foot member such that the first guide portion and the first fixed shaft are fitted with each other while the second guide portion and the second fixed shaft are fitted with each other.

The present invention can be applied to various information inputting apparatus such as information inputting apparatus of the separate type which are separate from a display such as a word processor, a personal computer or the like of the desk top type and information inputting apparatus such as a word processor, a personal computer or the like of the laptop type or notebook type integrated with a display.

Since the present invention is constituted in such a manner as described so far, it is possible to achieve reduction in thickness or size of an information inputting apparatus, and since a tilting mechanism can be arranged on a side face or the like of the apparatus, various ranges of designing of the apparatus and tilting mechanism can be achieved.

Further, since the tilting mechanism of the present invention is a combination of rotation and sliding motion, a locking mechanism when a foot member is set up or accommodated can be made more easily.

What is claimed is:

1. A tilting mechanism in combination with an information inputting apparatus, characterized in that a pair of substantially vertical face portions at a rear portion of said information inputting apparatus and a pair of foot members opposed to said substantially vertical face portions are engaged with each other said substantially vertical face portions being located on opposite side portions of said information inputting apparatus;

each of said vertical face portions has provided thereon a first fixed shaft and a first guide portion around said first fixed shaft which advances in a direction gradually spaced away from said first fixed shaft toward a bottom face of said information inputting apparatus, and a notch hole connected to a lower portion of said first guide portion and extending upwardly;

each of said foot members has provided thereon a second guide portion which is fitted for sliding movement with said first fixed shaft and extends in a longitudinal direction of said foot member and a second fixed shaft which is fitted for sliding movement with said first guide portion, and a resilient piece is provided projecting at a side portion of said foot member;

a foot cover, said foot cover is supported for rotation on said first fixed shaft and has an extending through portion provided therein for sliding movement relative to said foot member so that said foot cover may be rotated together with said foot member, and said foot cover further has a resilient piece receiving portion provided thereon with which said resilient piece is contacted when said second fixed shaft is positioned at said notch hole; and said second fixed shafts are slidably moved, when said information inputting apparatus is to be used, along said first guide portions from a retracted condition, and then also after said resilient pieces are contacted with said resilient piece receiving portions, said second fixed shafts are further slidably moved until said second fixed shafts are fitted with said notch holes thereby to thereafter maintain said foot members in a projecting condition; whereby said foot members may serve as legs of said information inputting apparatus thereby to tilt said information inputting apparatus.

2. A tilting mechanism for an information inputting apparatus according to claim 1, characterized in that
each first fixed shaft is provided at and extends outwardly from a position a lower than a central position of the side portion in the vertical direction.

3. A tilting mechanism for an information inputting apparatus according to claim 1, characterized in that
said second guide portions are formed from an axially symmetrical bifurcated portion, and the axis of symmetry of said bifurcated portion is positioned a eccentrically from an axial line of each of said foot member.

4. A tilting mechanism for an information inputting apparatus according to claim 1, characterized in that
a pivotal shaft is provided projectingly on each of said foot covers, and
a pair of third guide portions are provided uprightly and in parallel with each other at positions spaced apart equally from said pivotal shaft.

5. A tilting mechanism for an information inputting apparatus according to claim 4, characterized in that
the amount of eccentricity between an axis of symmetry of said pair of third guide portions and an axial line interconnecting a central portion of the extending through portion and a central point of said foot cover is equal to an amount of eccentricity between the axis of symmetry of said foot member and said axial line.

* * * * *